US010219519B2

(12) United States Patent
Marin Moro

(10) Patent No.: US 10,219,519 B2
(45) Date of Patent: Mar. 5, 2019

(54) PAN FOR BAKING BREAD

(71) Applicants: Magar Invest, S.L., Barbera del Valles (ES); Raquel Sofia Ferreira Santos, Maia (PT)

(72) Inventor: Tomás Marin Moro, Barbera del Valles (ES)

(73) Assignees: Magar Invest, S.L., Barbera del Valles (ES); Raquel Sofia Ferreira Santos, Maia (PT)

( * ) Notice: Subject to any disclaimer, the term of this patent is extended or adjusted under 35 U.S.C. 154(b) by 282 days.

(21) Appl. No.: 14/438,741

(22) PCT Filed: Oct. 29, 2013

(86) PCT No.: PCT/IB2013/059753
§ 371 (c)(1),
(2) Date: Apr. 27, 2015

(87) PCT Pub. No.: WO2014/068481
PCT Pub. Date: May 8, 2014

(65) Prior Publication Data
US 2015/0250189 A1 Sep. 10, 2015

(30) Foreign Application Priority Data
Oct. 31, 2012 (ES) .................... 201231162 U

(51) Int. Cl.
*A21B 3/13* (2006.01)
(52) U.S. Cl.
CPC .............. *A21B 3/135* (2013.01); *A21B 3/134* (2013.01)

(58) Field of Classification Search
CPC ........... A21B 3/135; A21B 3/134; A21B 3/13; A21B 3/133
(Continued)

(56) References Cited

U.S. PATENT DOCUMENTS 581,232 A * 4/1897 Hollandt .............. B65D 43/162
220/23.2
1,050,449 A * 1/1913 Gillespie ................ A21B 3/134
220/23.2
(Continued)

FOREIGN PATENT DOCUMENTS

AU 2007200951 A1 10/2007
CA 2129272 A1 2/1996
(Continued)

OTHER PUBLICATIONS

Makúch, Milan, "International Search Report," prepared for PCT/IB2013/059753, dated Apr. 2, 2014, four pages.

*Primary Examiner* — Dana Ross
*Assistant Examiner* — Kuangyue Chen
(74) *Attorney, Agent, or Firm* — Winstead PC

(57) ABSTRACT

It comprises a plurality of baking moulds (2), a plate (3) acting as a cover of said pan (1), and means to prevent the raising of said plate as the bread is baked inside said moulds, and is characterized in that said means to prevent the raising of said plate comprise a fastening device (12) associated to a structure (9, 22) of said pan (1), said fastening device (12) including at least one hook (11) which is hingedly joined to a shaft (23) of said structure (9, 22), said hook (11) being susceptible of catching a portion (3a, 3b) of said plate (3) when it tilts on said shaft (23).

16 Claims, 12 Drawing Sheets

(58) Field of Classification Search
USPC .......................... 99/426, 441, 428, 439, 432
See application file for complete search history.

(56) References Cited

U.S. PATENT DOCUMENTS

| | | | | |
|---|---|---|---|---|
| 2,023,812 A | * | 12/1935 | Jackson | A21B 3/134 |
| | | | | 220/23.6 |
| 2,071,845 A | * | 2/1937 | Kowalski | A21B 3/134 |
| | | | | 220/553 |
| 2,654,502 A | * | 10/1953 | Kollman | A21B 3/134 |
| | | | | 220/200 |
| 2,903,151 A | * | 9/1959 | Alcaro | A21B 3/135 |
| | | | | 220/23.2 |
| 3,476,262 A | * | 11/1969 | Edwards | A21B 3/135 |
| | | | | 108/91 |
| 3,862,339 A | * | 1/1975 | Balboni | A21D 8/06 |
| | | | | 426/19 |
| 4,684,024 A | * | 8/1987 | Ebrahim | B65D 45/18 |
| | | | | 206/464 |
| 5,048,707 A | | 9/1991 | Hallberg | |
| 6,003,705 A | * | 12/1999 | Burguieres, Jr. | B65D 88/128 |
| | | | | 220/1.5 |
| 2004/0094043 A1 | | 5/2004 | Morgan | |
| 2010/0101430 A1 | * | 4/2010 | Abascal Albizu | A22C 7/0053 |
| | | | | 99/339 |
| 2012/0003363 A1 | | 1/2012 | Beloff | |

FOREIGN PATENT DOCUMENTS

| | | | | |
|---|---|---|---|---|
| FR | 1166787 A | * | 11/1958 | ............. A21B 3/133 |
| FR | 1166787 A | | 11/1958 | |
| GB | 386377 A | | 1/1933 | |

* cited by examiner

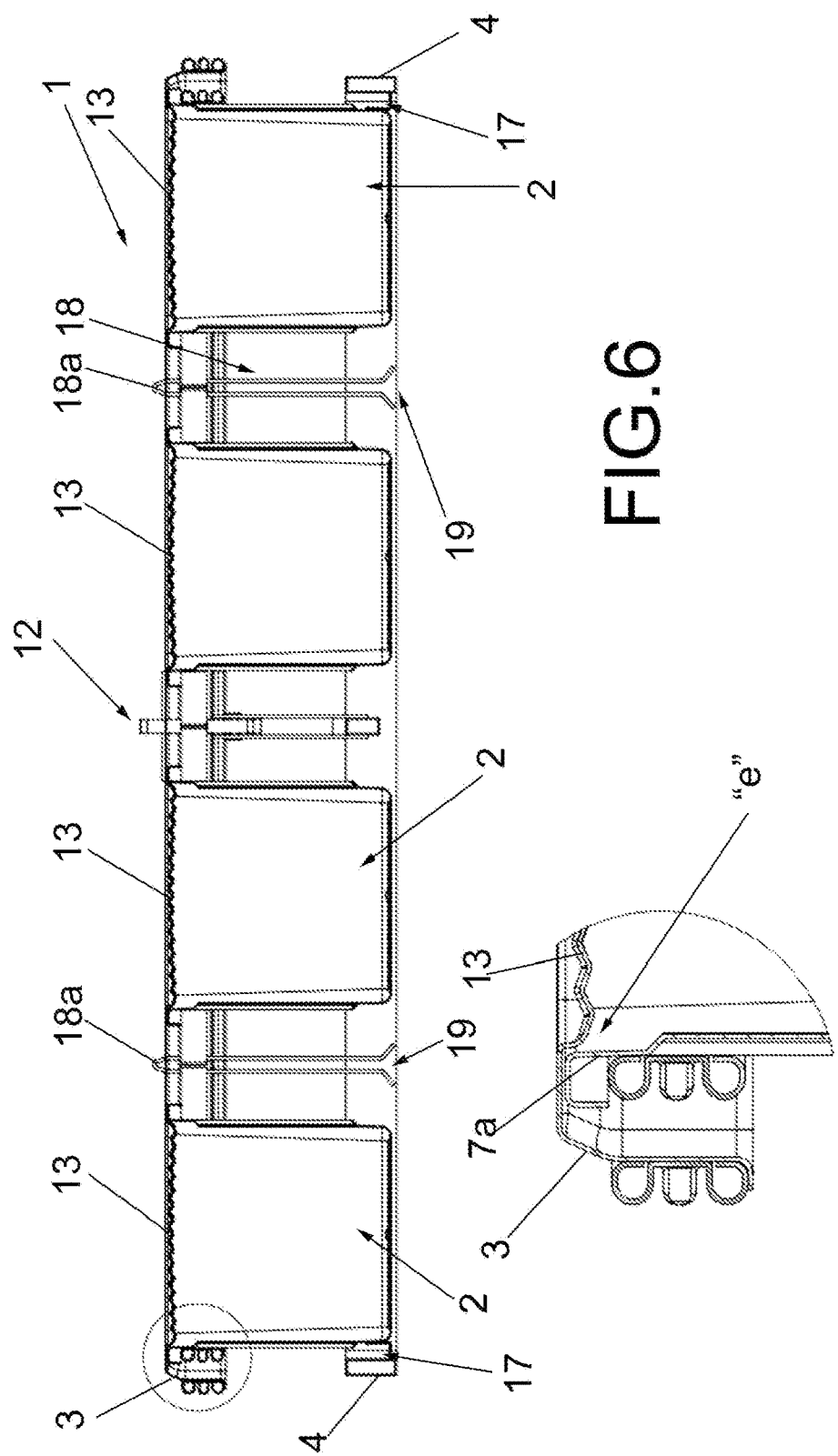

PAN FOR BAKING BREAD

The present invention relates to a pan for baking bread on an industrial scale which has a plate acting as a cover and is, nevertheless, light and easy to handle.

BACKGROUND OF THE INVENTION

Pans are known for baking the type of bread known as pan loaf on an industrial scale. These pans comprise a plurality of baking moulds and, in many cases, a plate acting as a cover of the pan.

Said plate acting as a cover is placed to avoid the upper part of the bread from becoming convex and thus obtaining, insofar as possible, a loaf of uniform square or rectangular section which is easy to handle. Nevertheless, it has been observed that, in practice, despite the use of the cover, the existing pans obtain a loaf which has many irregularities or bulges on its surface.

During the baking process of the pan loaf on an industrial scale, said pans are displaced empty along chains until reaching the production chain where the raw bread dough falls inside the moulds. Next, the pans are covered with said plate acting as a cover and they enter the fermentation process.

Once the dough has fermented, the pans enter the oven to bake the dough. During baking it is necessary to maintain the pans covered to guarantee the square form of the bread. However, during baking the bread dough may displace the plate that serves as a cover. To prevent the raising of the plate, it is typical to use plates or covers of a heavy weight (6 to 8 kg) which are not displaced with the thrust of the bread dough. However, these plates hinder fast heat transmission and are difficult to handle.

Fast heat transmission during the baking process is essential to avoid problems in the quality of the inner structure of the bread (if the heat is not transmitted quickly it favours the formation of air bubbles). Therefore, to achieve a fast transmission of heat during baking, it is convenient to reduce to a maximum the thickness of the plate that configures the moulds, the same as the thickness of the plate acting as a cover of the pan. Nevertheless, if the plate that configures the moulds is of little thickness the mould base will tend to easily wear during its displacement on the industry's transport chains. On the other hand, if the plate acting as a cover is of little thickness, this plate moves during the baking of the bread preventing a loaf of uniform section from being obtained.

To avoid wear of the pan, it is typical to resort to reinforcing structures that laterally cover the pan and give it resistance. However, these reinforcing structures also hinder the uniform transmission of heat in certain areas, which translates into a less homogeneous baking which negatively affects obtaining a regular shaped loaf.

In light of the above, it would be desirable to have a light pan which guarantees fast baking and obtaining a loaf with uniform section, which was resistant and easy to handle.

DESCRIPTION OF THE INVENTION

The objective of the present invention is that of resolving the aforementioned drawbacks, providing a pan for baking bread which has the advantages that will be described below.

In accordance with this objective, the present invention provides a pan for baking bread comprising a plurality of baking moulds, a plate acting as a cover of said moulds, and means to prevent the raising of said plate as the bread is baked inside said moulds, and it is characterized in that said means to prevent the raising of said plate comprise a fastening device associated to a structure of said pan, said fastening device including at least one hook which is hingedly joined to said structure, said hook being susceptible of fastening a portion of said plate when it tilts on said structure.

The fastening device has the advantage that it effectively and safely prevents raising the cover without the need to resort to the use of plates with a heavy weight. In particular, it has been observed that with this fastening device the weight of the cover can be reduced to approximately 4 kg, which positively results in a large energy saving (quicker baking with smaller energy consumption). Furthermore, the pan is light and easy to handle.

Another advantage of the pan claimed lies in the fact that said fastening device makes it possible to implement on an industrial scale an automatic process to place and remove the plate acting as a cover, externally actuating said hook or a counterweight that is associated with said hook. This positively leads to an improvement in the bread production yield.

Preferably, said fastening hook is hingedly joined to a shaft of a structure of the pan which is interposed between two of said baking moulds and, advantageously, said structure is joined to the outer walls of two of the pan moulds. Again advantageously, said plate acting as a cover comprises a lower portion which extends from the underside of said plate, said lower portion being interposed between two of said moulds in order that it can be gripped by said hook whilst said hook remains concealed under the plate in a closed position of the plate.

In this way, as the hook is concealed under the plate in the closed position, a pan is obtained of a compact design which facilitates industrial handling, whilst it avoids the accidental opening of the hook.

According to a different embodiment, the plate comprises an upper portion arranged traversed in a plate groove, said hook being susceptible of fastening said upper portion when it tilts and traverses said groove.

Preferably, said fastening hook is joined to a weight configured by way of a counterweight to tilt said hook automatically and fasten the plate, said same weight being susceptible of acting as a counterweight if actuated in the opposite direction to release the hook from the plate.

In this way, the cover is very easy to place and remove which facilitates the industrial application of the pan. For example, the weight acting as counterweight of the hook can be actuated in its lower part by a piston located under the transport chain of the pan to make the hook tilt and release the plate. Alternatively, the hook can be actuated in its upper part to make it tilt and release the plate. These two options have been represented in the figures section of the present application.

Advantageously, the structure of the pan whereto the fastening hook is joined comprises a piece which acts as a stop to limit the tilting movement of the weight and said hook.

Again advantageously, the upper edge of said hook has a curved profile to facilitate the sliding and upper placement of the plate acting as a cover.

According to an embodiment of the pan of the present invention, the plate acting as a cover comprises a plurality of recesses which act by way of a cover of each one of said moulds, each one of said recesses defining an insert "e" of the plate in the upper edge of the walls of said moulds. This insert "e" enables an adjustment between the plate and the walls of the moulds which makes it possible to accurately fix the dimensions of the internal cavity wherein the dough is housed during the baking. In this way, it guarantees that a loaf is obtained with uniform section, since the dough growth space is exactly delimited. Furthermore, said insert "e" facilitates and contributes to the fastening of the plate.

The obtainment of a loaf with uniform section according to design and a free of irregularities on its surface have the advantage that it facilitates handling during packaging. Indeed, it has been observed that the form of the uniform loaf facilitates the packaging process (use of standard measurement packaging).

Preferably, said recesses of the plate each define an insert "e" equal to or greater than 5 mm in the upper edge of the walls of said moulds. These recesses of the plate may be obtained by a process of inlaying or stamping of a sheet, preferably a metal sheet.

Advantageously, the surface of the recesses designed to cover the opening of the moulds has corrugations and, preferably, said corrugations configure waves with wavelengths equal to or less than 9 mm. These corrugations have the advantage that they increase the heat transmission surface of the plate during baking. Again advantageously, the surface of the recesses designed to cover the opening of the moulds has a cross-section of slightly convex profile. This avoids the formation of depressions in the bread after baking.

Preferably, the surface with corrugations of the recesses comprises a plurality of orifices to allow the entry of hot air. This air inlet favours fast heat transmission to the dough.

Advantageously, the pan moulds comprise sidewalls provided with corrugations, lacking at least the upper edge of said walls of said corrugations to enable the insertion of the plate recesses. The corrugations in the sidewalls facilitate fast heat transmission during baking. Preferably, the corrugations of said side walls define a plurality of ribs which are vertically disposed with respect to the base of said pan. It has been observed that the vertical ribs facilitate the extraction of the bread once baked and protect the inner coating of the moulds from wear.

According to a preferred embodiment, said pan comprises a reinforcing structure which includes a tubular profile disposed on the periphery of said pan, said tubular profile enveloping the edges of said moulds and said tubular profile being mounted separated from said edges so that it defines a space for the air circulation. This enveloping tubular profile has the advantage that it laterally reinforces the pan and enables at the same time uniform baking since the hot air circulation guarantees fast heat transmission to the edges of the moulds, which also translates into a significant energy saving.

Advantageously, said tubular profile is mounted so that it appreciably protrudes from the base of the moulds to protect said moulds from wear. Thanks to this, the same reinforcing structure of the pan edges protects the base of the moulds without negatively affecting the thermal transmission of heat. All of this enables the manufacturing of a resistant pan which can be manufactured with sheet thicknesses less than 1 mm, which again leads to a significant energy saving for the bread maker.

According to said same preferred embodiment, said pan comprises means for the vertical stacking of two or more units, said stacking means including a plurality of lugs which are vertically extended upwards from the reinforcing structure of the pan, said lugs being susceptible of being inserted in a plurality of recipient cavities associated to the reinforcing structure of another pan, the plate acting as a cover of the pan being provided with a plurality of grooves wherethrough said lugs protrude when the recesses of said plate cover the openings of the moulds. These means allow the vertical stacking of the pan without the need to dispense with the reinforcing structure which protects the edges and the base of the moulds.

Advantageously, each one of said lugs is configured from a profile which defines in its lower end a recipient cavity of the lug of another pan and in its upper end a protuberance for the insertion of said lug in the cavity of another pan.

In the present invention, recess is understood as a portion of the plate acting as a cover configured to penetrate in the inner cavity of each one of said moulds. These recesses are further configured so that each defines an insert "e" of the plate in the upper edge of the walls of the moulds. This insert "e" enables an adjustment of the plate in the inner cavity of the moulds where the dough is housed.

Despite the fact that in this description reference has been made to the fastening device of the plate in combination with the recesses of said plate, it is necessary to highlight that the configuration of a cover or plate with recesses is in itself a claimable aspect of the pan. In this sense, according to an also claimable aspect the present invention a pan is provided for baking bread comprising a plurality of baking moulds, a plate acting as a cover of said moulds, and means to prevent the raising of said plate as the bread is baked inside said moulds, and it is characterized in that the plate acting as a cover comprises a plurality of recesses which act by way of a cover of each one of said moulds, each one of said recesses defining an insert "e" of the plate in the upper edge of the walls of said moulds.

BRIEF DESCRIPTION OF THE FIGURES

For a better understanding of all that disclosed, drawings are attached wherein, diagrammatically and only as a non-limitative example, two embodiments of the invention are represented.

In said drawings;

FIG. 6 is a longitudinal section of the pan of FIG. 4.

FIG. 7 shows a detail of the section of FIG. 6.

DESCRIPTION OF PREFERRED EMBODIMENTS

A preferred embodiment is described below of the pan of the present invention making reference to FIGS. 1 to 9.

The pan 1 of the present invention comprises four baking moulds 2 and a plate 3 acting as a cover of said moulds 2. These moulds 2 serve for the baking, on an industrial scale, of the bread popularly called "pan loaf".

Figure 1:
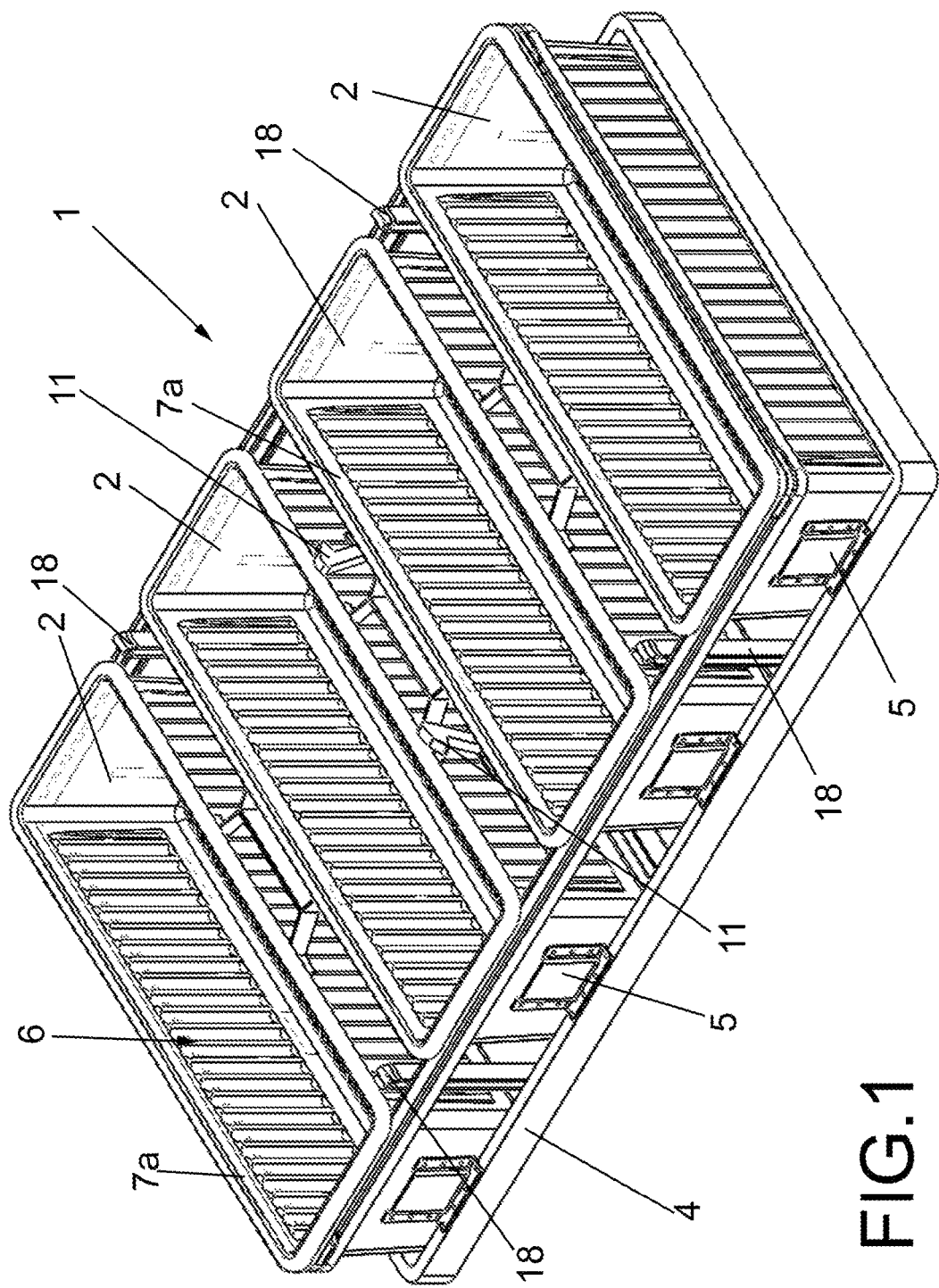
FIG. 1 is a perspective view of a first embodiment of the pan provided with four baking moulds.

FIG. 1 shows an embodiment of the pan 1 showing the enveloping tubular profile 4 acting as reinforcing structure of the pan 1 and protects the edges of the moulds 2. This profile 4 is mounted on fastening parts 5 integrally joined to the walls of the ends of the moulds 2. The same FIG. 1 shows the corrugations 6 of the longer sidewalls 7 of the moulds 2 which have the function of facilitating the fast heat transmission during the baking process of the dough. As can be observed in FIG. 1, these corrugations 6 define a plurality of vertical ribs 6a with respect to the base of the moulds 2 which have the function of facilitating the extraction of the bread once baked.

Figure 2:
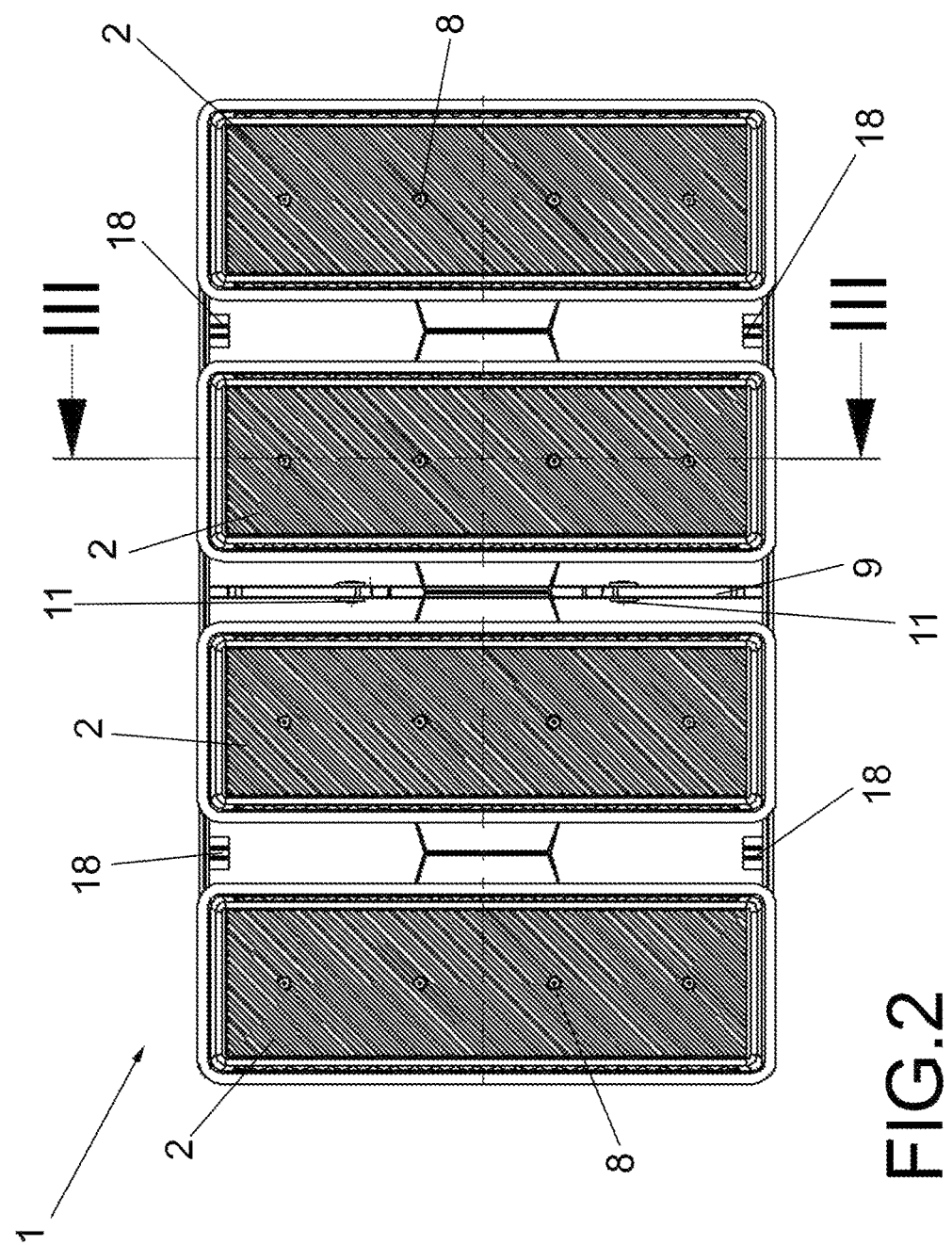
FIG. 2 is a plan view of the pan of FIG. 1.
Figure 3:
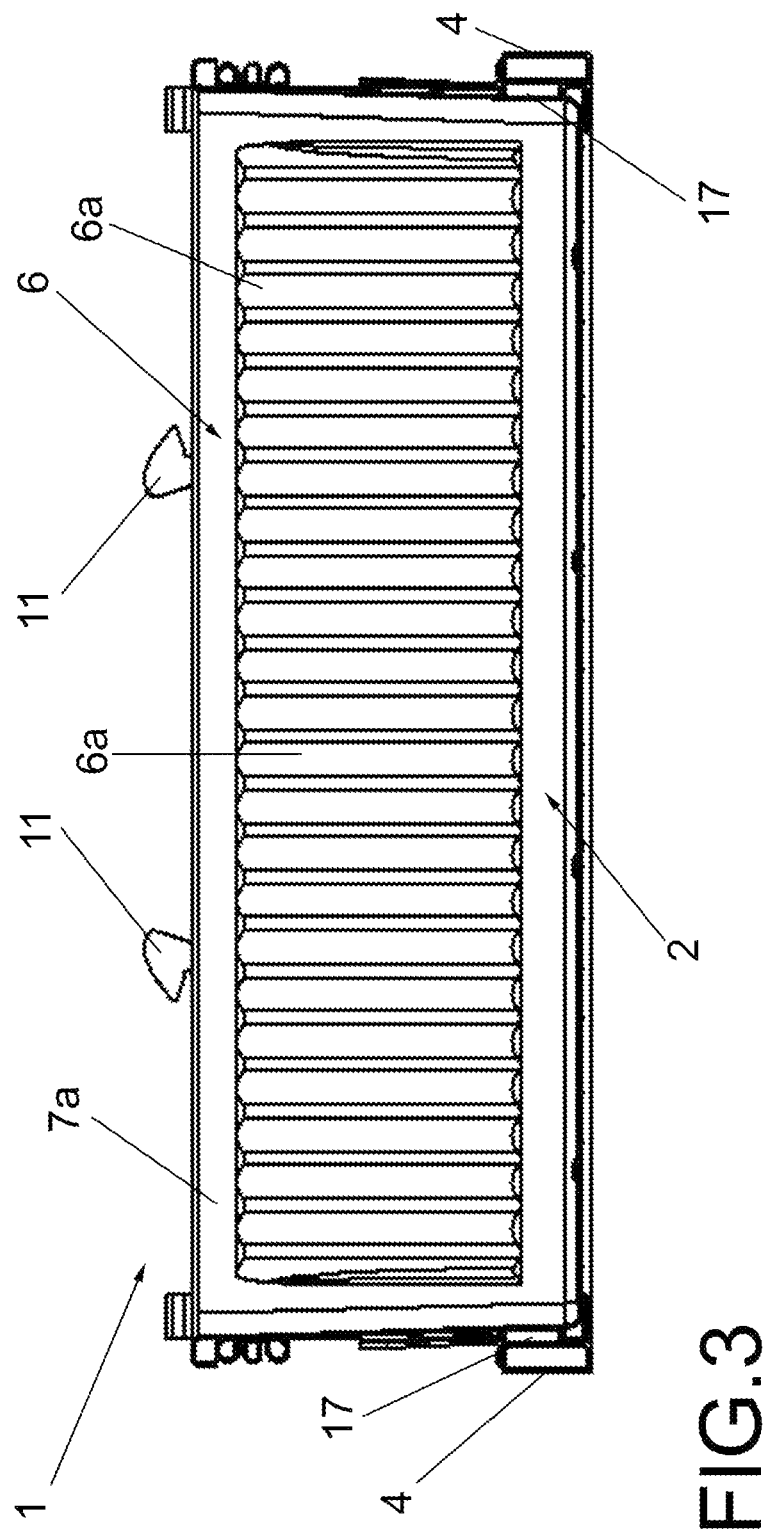
FIG. 3 is a section of the pan of FIG. 2.

FIG. 2 shows a plan view of the pan 1 of FIG. 1 lacking the plate 3 acting as a cover and FIG. 3 a cross-section of said pan 1. FIG. 2 shows the air inlet orifices 8 of the base of the pan 1, and the bar 9 wherein the supports 20 of the hooks 11 of the fastening device 12 of the plate 3 are mounted. The ends of this bar 9 are integrally joined to the enveloping tubular profile 4 which protects the edges of the moulds 2.

Figure 4:
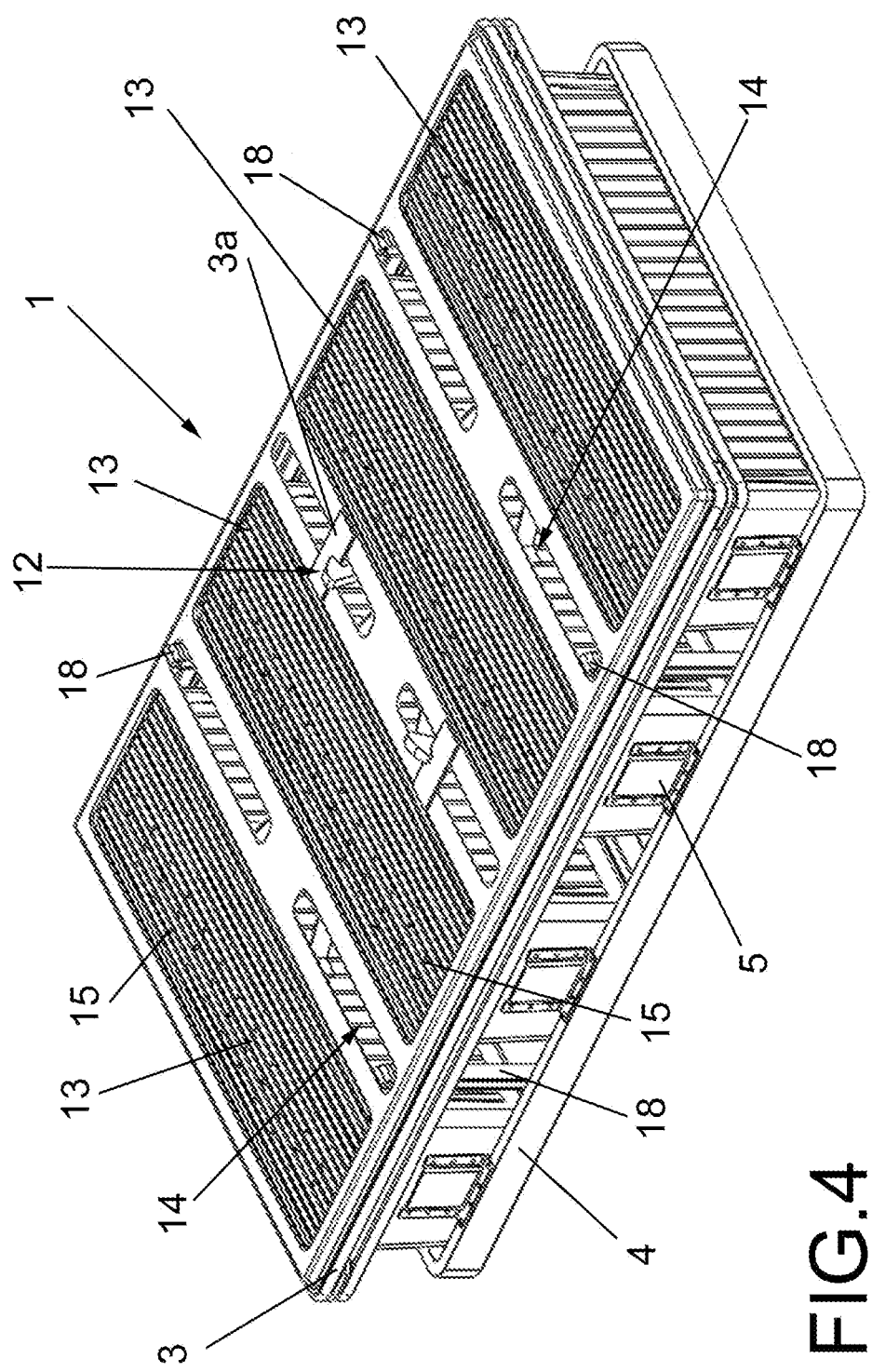
FIG. 4 is a perspective view of the same pan of FIG. 1 provided with a cover.

FIG. 4 shows a perspective view of the same pan 1 of FIG. 1 provided with the plate 3 comprising the recesses 13 which act as cover of the moulds 2. As can be seen in this FIG. 4, the plate 3 is provided with a plurality of grooves 14 which extend longitudinally between each two recesses 13. These grooves 14 facilitate the air circulation to favour the heat transmission during the baking and, furthermore, enable the installation of the hooks 11 of the fastening device 12. The same FIG. 4 shows the air inlet orifices 15 provided on the portions of the plate 3 which define the recesses 13.

FIG. 6 shows a longitudinal section of the pan 1 provided with the plate 3 which has the recesses 13 which act as cover of the moulds 2. As can be seen in FIG. 6, the recesses 13 penetrate inside the cavity of the moulds 2 defining an insert "e" in the upper edge of the walls. The same FIG. 6 shows the corrugations 16 of the surface of the recesses 13 and the section of the enveloping tubular profile 4. This profile 4 acts as a reinforcement and is mounted separated from the edges of the moulds 2 so that it defines a space 17 for the air circulation. Furthermore, as can be observed in the section, the tubular profile 4 protrudes from the base 2a of the moulds 2 to protect said base 2a from the wear caused by contact with the transport chains of the industry. In this way, the thickness of the sheet that the moulds 2 is manufactured with may be lower than 1 mm, preferably of a thickness of 0.8 mm to facilitate maximum energy saving.

It has been observed that the existence of this reinforcing tubular profile 4 hinders the vertical stacking of the pans 1, since it would not allow the introduction of a mould 2 of a pan 1 inside the mould of another pan similar to that claimed. To avoid this drawback, the present invention proposes means of vertical stacking which include lugs 18 which extend vertically upward towards the reinforcing tubular profile 4 and are susceptible of insertion in recipient cavities associated to the reinforcing structure or profile of another pan similar to that claimed.

In the embodiment described, each one of said lugs 18 is configured by a profile which defines at its lower end a recipient cavity 19 of the lug of another pan and at its upper end a protuberance 18a for the insertion of said lug 18.

Figure 8:
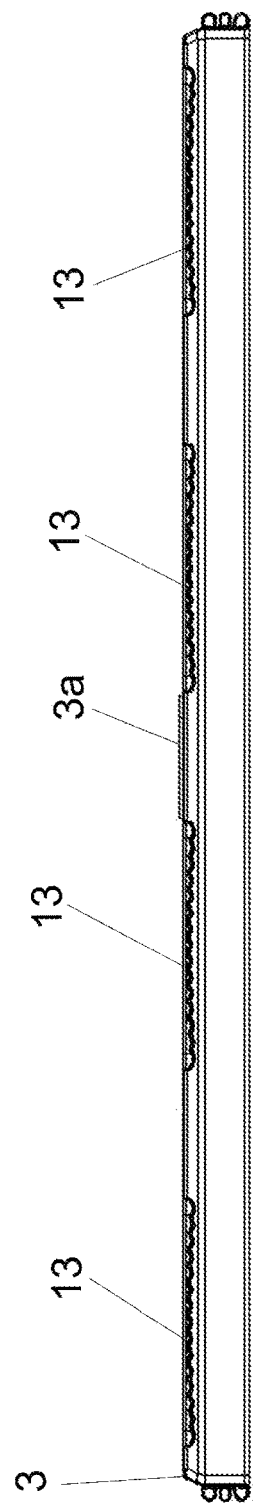
FIG. 8 is a longitudinal section of the cover of the pan which shows the recesses.
Figure 9:
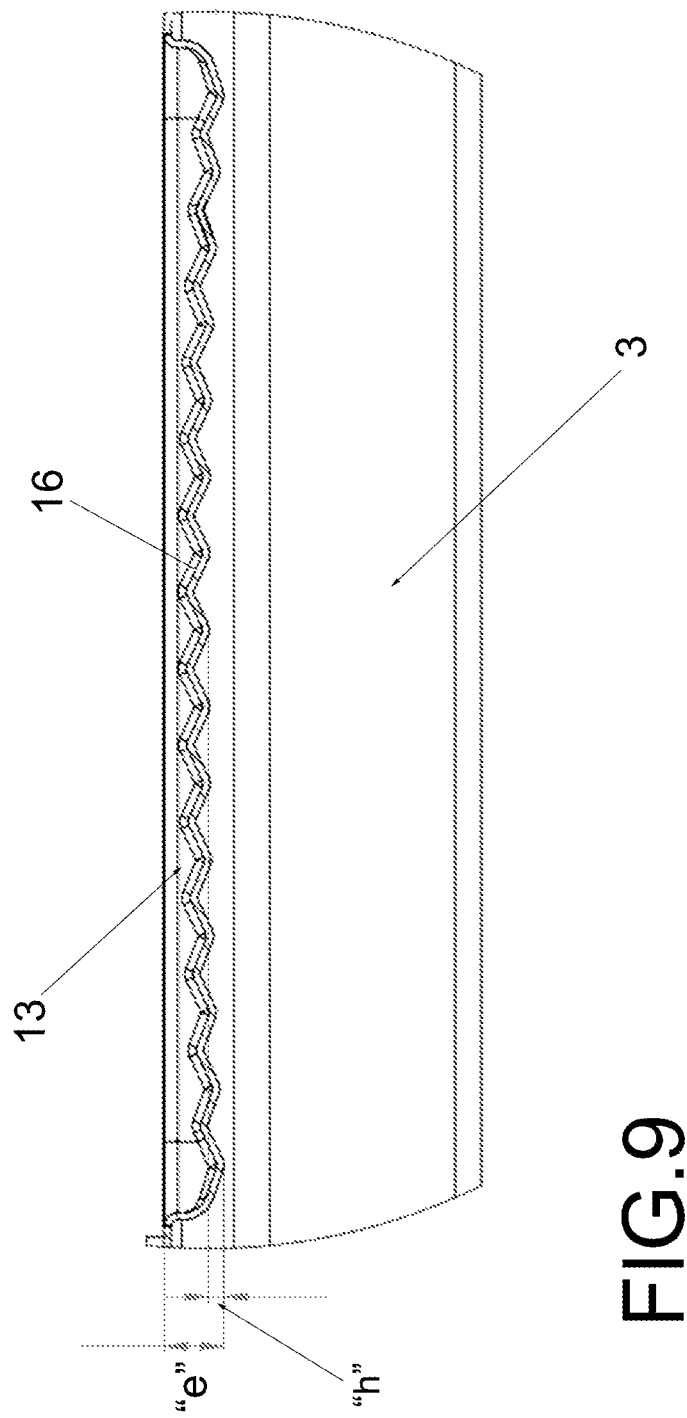
FIG. 9 is a detail of the cover of FIG. 8 which shows a recess and the insert "e" defined by said recess.

Returning to the plate 3 which has the recesses 13 which act as a cover, FIG. 9 shows a detail of the longitudinal section of the plate 3 of FIG. 8 wherein the slightly convex profile of said recesses is observed 13, which, in this case, has been obtained by inlaying of the plate 3 and defining a convexity of a height "h" of 2.20 mm. The same FIG. 9 shows the corrugations 16 of the plate 3 which facilitate heat transmission during the baking, as well as the insert "e" to allow the adjustment with the upper edge of the walls of the moulds 2.

FIG. 7 shows a detail of the longitudinal section of the pan 1 wherein the insert "e" of a recess 13 is observed of the plate 3 acting as a cover in a mould 2 of the end of the pan 1. As can be seen in this FIG. 7, the recess 13 penetrates in the inner cavity of the mould 2 accurately adjusting to the upper edge 7a of the walls 7 to exactly delimit the growth space of the dough. In the same FIG. 7 it is observed how the edge 7a of the walls 7 of the mould is lacking corrugations to enable the insertion of the recess 13 of the plate 3.

Figure 5:
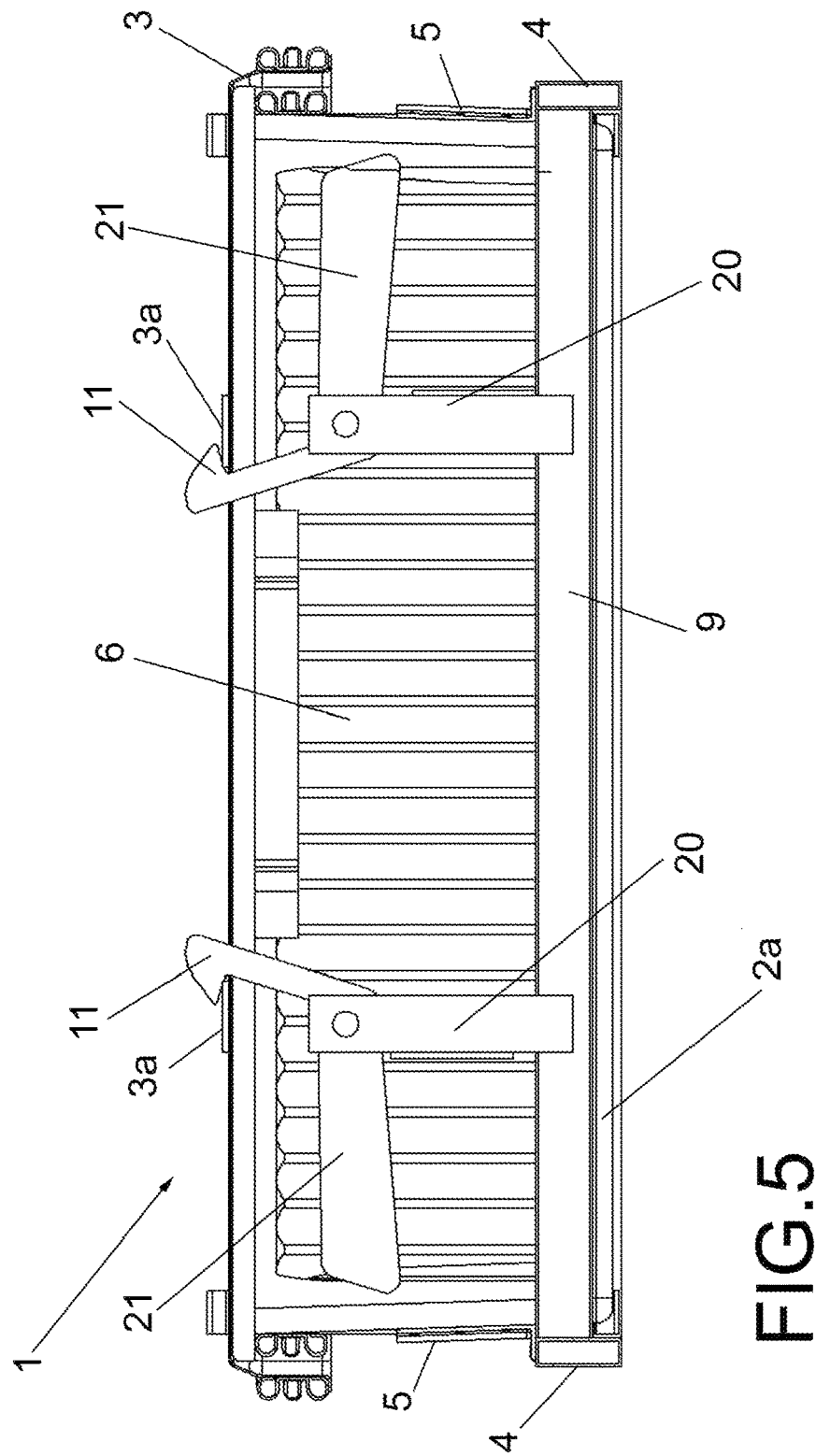
FIG. 5 is a cross-section of the pan of FIG. 4 showing the fastening device of the cover.

Now returning to the fastening device 12 of the plate 3, FIG. 5 is a cross-section of the pan 1 of FIG. 3 wherein said device 12 is observed in detail. As can be seen in this FIG. 5, in the embodiment described, the fastening device 12 comprises a pair of hooks 11 which are hingedly joined to one end of a vertical support 20 which is joined to a bar 9 integrally joined to the enveloping tubular profile 4. Each one of the hooks 11 automatically tilts towards the closed position thanks to a weight 21 which is associated to the body of the hook 11. On tilting to this closed position, each one of the hooks 11 traverses a groove 14 of the plate 3 to catch an upper cover portion 3a of said plate 3 by a fastening member 11a. The same FIG. 5 shows the upper rounded edge of the hooks 11 to facilitate the upper sliding of the plate 3 and the tilting of the hook 11.

The fastening device 12 claimed has the advantage that it is very simple, effective and safe. Furthermore, it allows reducing the weight of the cover to approximately 4 kg which results in a lower energy consumption during baking. On the other hand, said fastening device 12 is very easy to apply industrially thanks to the automatic closure system. The pan 1 is light and resistant and guarantees the obtainment of a loaf with a regular section, since the recesses 13 effectively delimit the bread baking cavity.

A second embodiment is described below of the present invention making reference to FIGS. 10 to 13.

Figure 10:
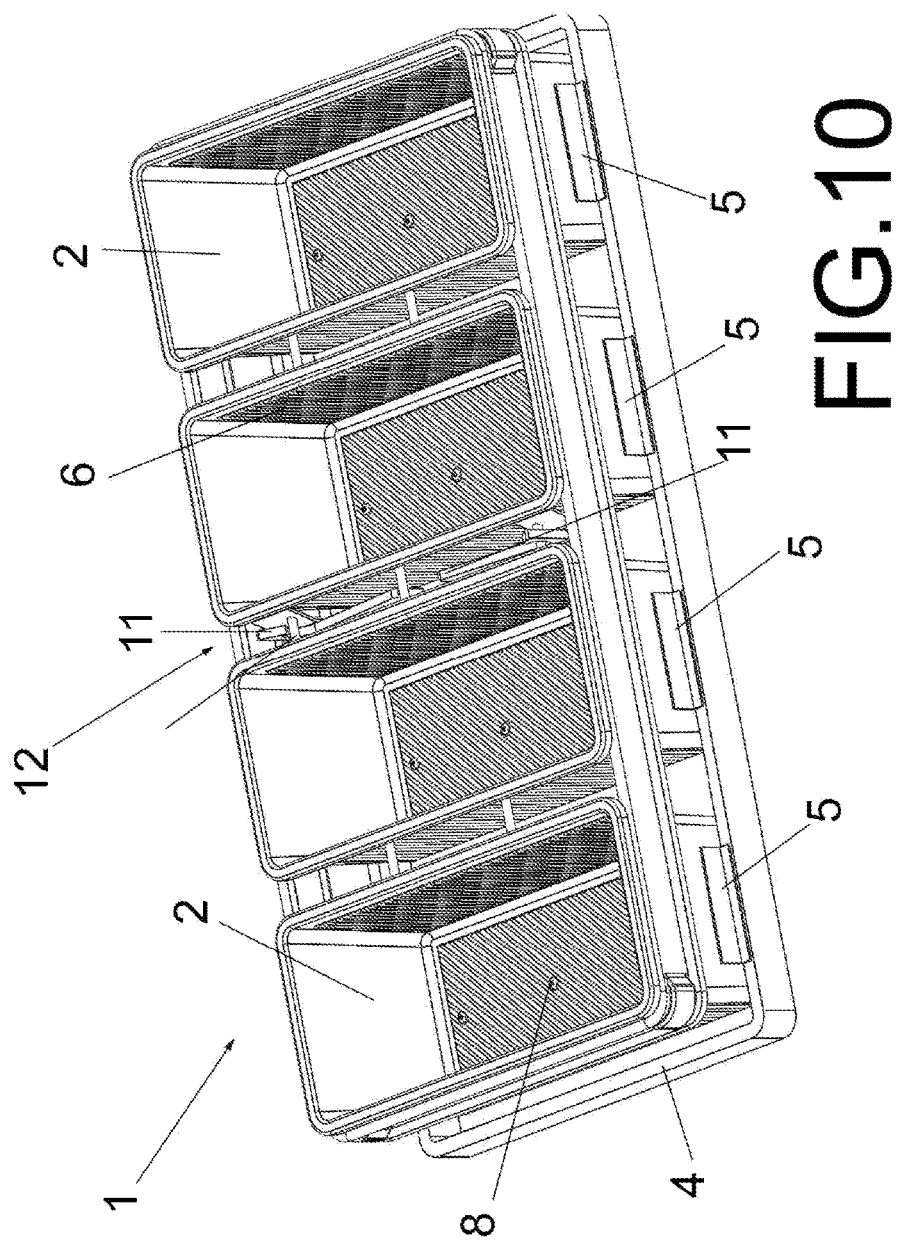
FIG. 10 shows a perspective view of a second embodiment of the pan. In this embodiment the hooks of the fastening device of the plate are joined to structures of the pan which hang joined to the walls of two moulds.

The embodiment of the pan 1 shown in FIG. 10 is differentiated from the aforementioned embodiment in the fact that the fastening device 12 is associated to a pair of structures 22 of the pan 1 which are interposed between two moulds 2, so that they hang joined to the walls of said moulds 2. Each one of said structures 22 includes a shaft 23 whereto is hingedly joined a fastening hook 11 of the plate 3 acting as a cover. The hooks 11 can tilt on the shafts 23 to each catch a lower portion 3b of the plate 3.

Figure 11:
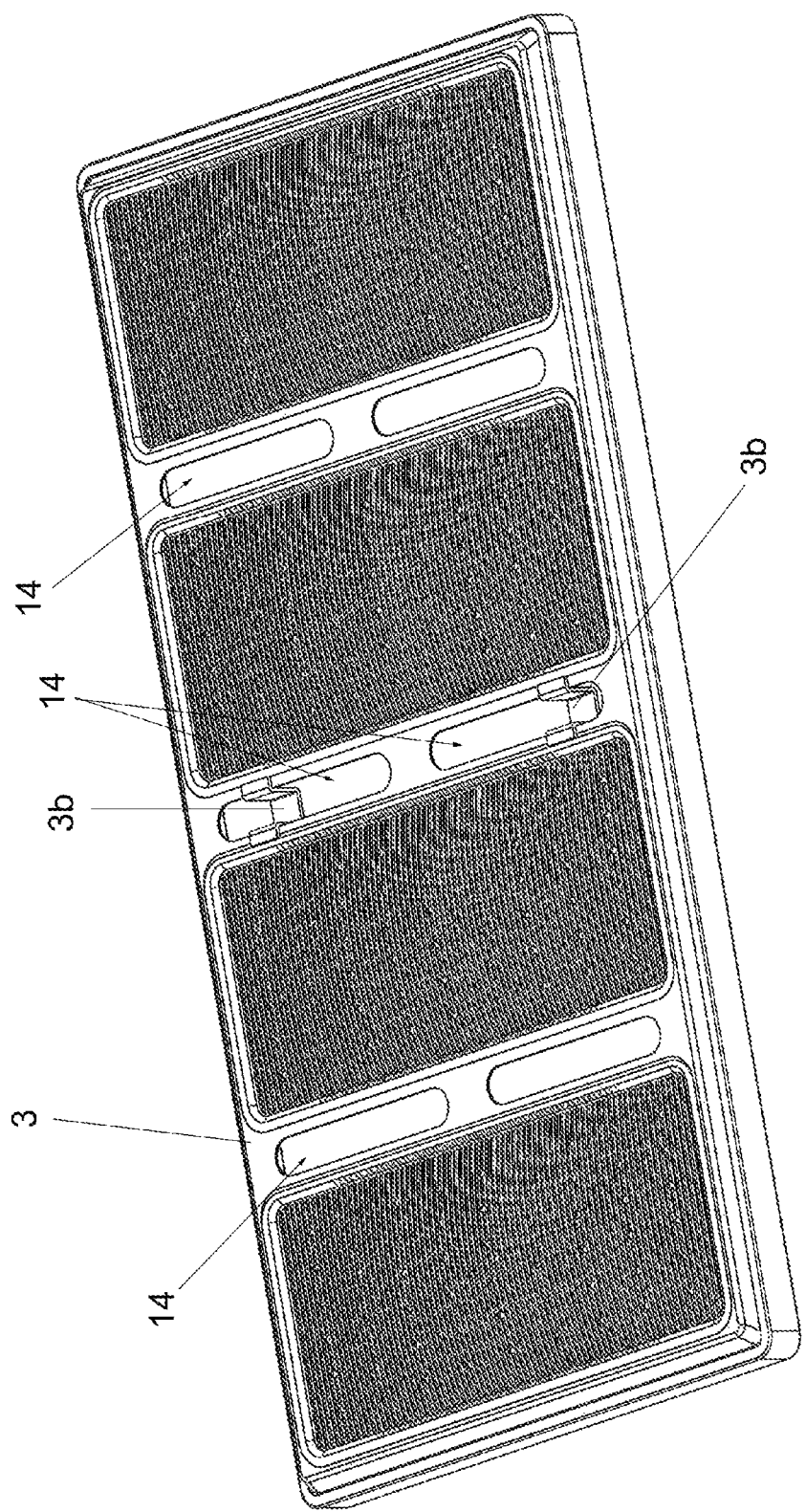
FIG. 11 shows a top perspective view of a plate which acts as a cover of the pan of the embodiment of FIG. 10.

As with the previous embodiment, the hooks 11 automatically tilt to the closed position thanks to a weight 21 which is configured by way of a counterweight and associated to the body of the hook 11. However, in this embodiment, the hooks 11 remain concealed under the plate 3 in the closed position of the plate 3, which provides a more compact design which further facilitated the handling of the pan 1 in the production chain (see FIGS. 12 and 13). As can be observed in the sections of FIGS. 12 and 13, in this embodiment, the plate 3 acting as a cover includes a pair of lower portions 3b which extend from the underside of the plate 3 to be able to be gripped. FIG. 11 shows a top perspective view of the plate 3 where said lower portions 3b can be observed.

Figure 12:
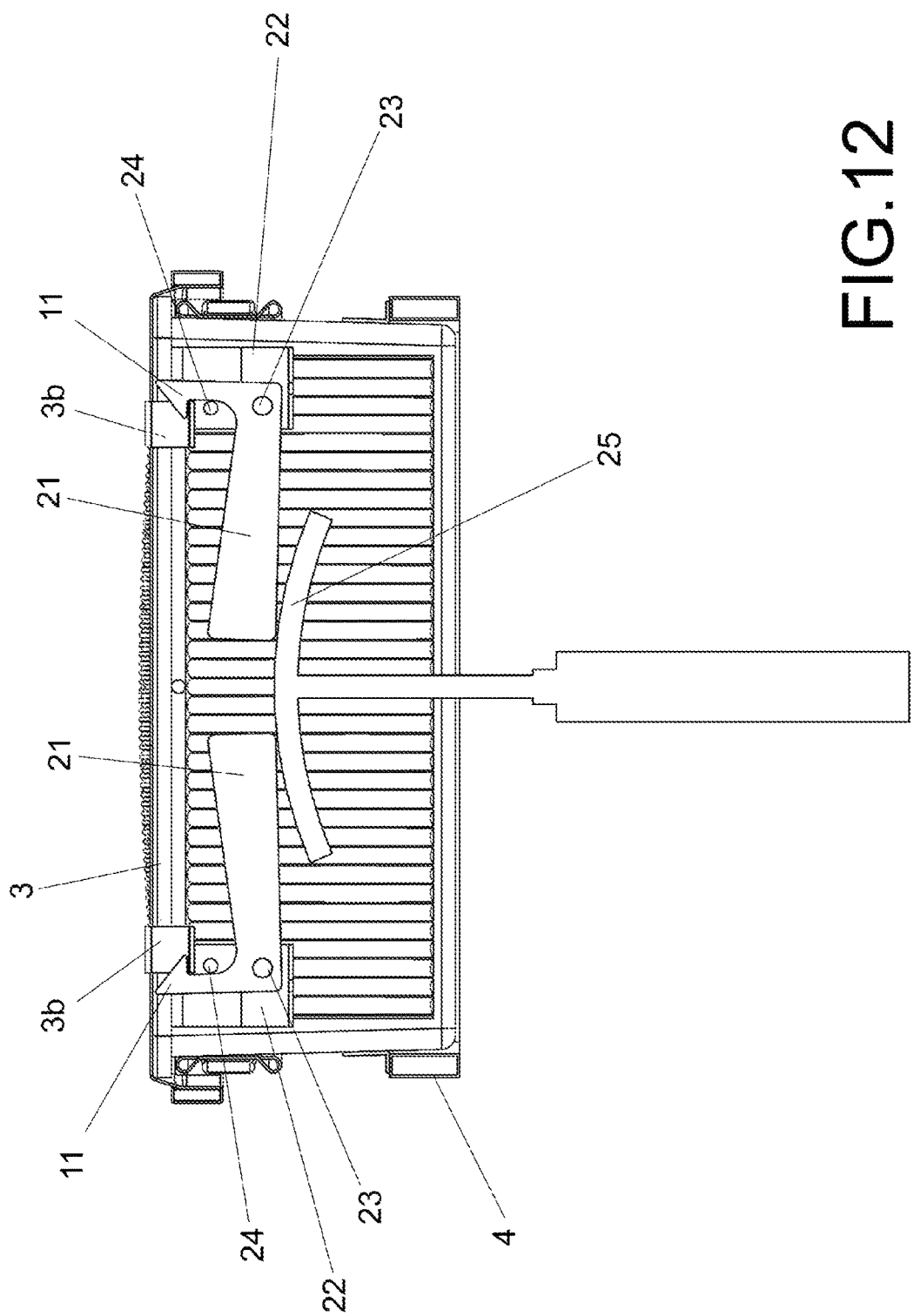
FIGS. 12 and 13 are two cross-sections of the pan of FIG. 10 covered with the cover of FIG. 11. These sections diagrammatically show two ways of actuating the hook and the weight of the fastening device to release the plate acting as a cover.
Figure 13:
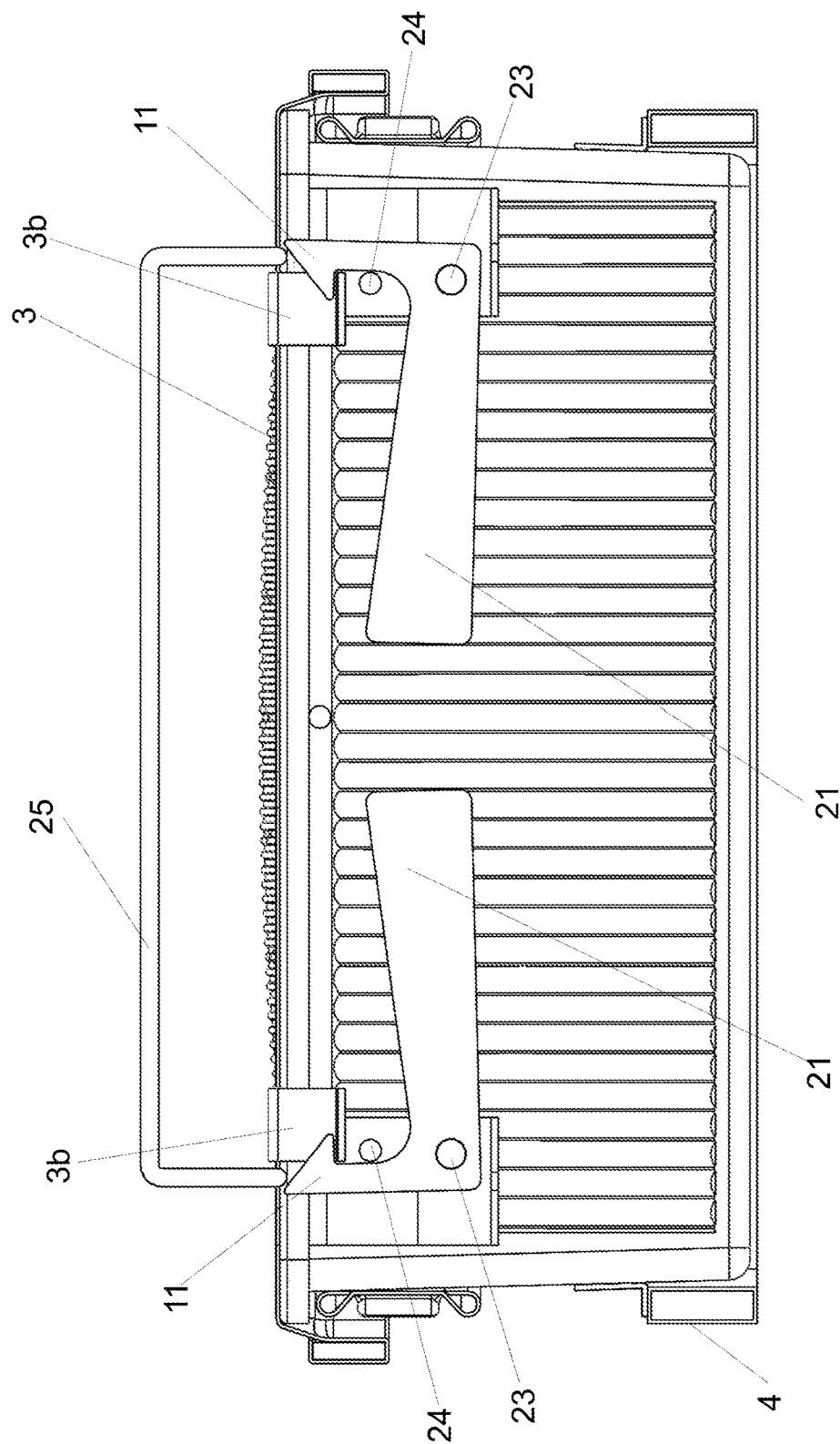

FIGS. 12 and 13 show the shafts 23 whereon the hooks 11 tilt, and the part 24 which acts as a stop to limit the movement of the hooks 11. As can be observed in these figures, in the closed position of the plate 3, the hooks 11 fasten the lower portions 3b remaining at the same time concealed under the plate 3.

And as has been commented in the description of the invention, both the hooks 11 and the weights 21 can be actuated by a piston or equivalent member to automatically and continuously release the plate 3 without having to stop the production chain. For example, FIG. 12 schematically represents, a piston 25 disposed to actuate from the lower part of the pan 1 the weights 21 and make the hooks 11 tilt in order to release the plate 3.

FIG. 13 represents an alternative manner of releasing the same hook 11 by an actuating member disposed to simultaneously press the edge of the hooks 11 and make the weights 21 tilt in order to release the plate 3.

Despite the fact that reference has been made to a specific embodiment of the invention, it is evident for a person skilled in the art that numerous variations and modifications can be introduced in the pan 1 described, and that all the details mentioned can be replaced by other technically equivalent ones, without departing from the scope of protection defined by the attached claims. For example, although in the present invention the fastening device 12 has been described combined with a plate 3 provided, preferably, with recesses 13, the same device 12 could be useful to apply in a pan provided with a conventional plate, this device 12 in itself constituting a claimable aspect of the present application. Likewise, although the fastening hook 11 has been described in FIGS. 1 to 9 hingedly joined to a shaft of the bar 9 through a vertical support 20, the same hook can be joined or hinged directly to a bar or part of the pan structure which is situated so that it allows actuation of the weight 21 by the lower part or base of the pan, as shown in FIG. 12. This detail enables the automatic opening of the cover from the base making the hook tilt.

The invention claimed is:

1. A pan for baking loaf bread, the pan comprising;
a plurality of baking molds, each baking mold of the plurality of baking molds substantially having a shape of square prism;
a plate acting as a cover of the pan;
a fastening device that prevents raising of the plate as the bread is baked inside the plurality of baking molds, the fastening device being associated to a structure of the pan;
wherein the fastening device includes at least one hook which is articulately joined to a shaft of the structure of the pan which is interposed between two of the baking molds;
wherein the plate acts as the cover and comprises a cover portion arranged to be gripped by the hook, the hook being disposed to fasten the cover portion of the plate when it tilts by gravity on the structure by action of a weight configured by way of a counterweight; and
wherein the hook is joined to said weight configured by way of the counterweight to make the hook tilt by gravity to grip the cover portion of the plate, said same weight being arranged to be able to be actuated in the opposite direction so that its actuation makes the hook tilt automatically to release the hook from the cover portion of the plate.

2. The pan according to claim 1, wherein the plate acting as the cover comprises the portion of the plate which extends downwards from an underside of the plate, and said portion being interposed between two of the baking molds in order that it can be gripped by the hook whilst the hook remains concealed under the plate.

3. The pan according to claim 1, wherein the structure of the pan whereto the hook is joined comprises a piece which acts as a stop to limit a tilting movement of the weight and the hook.

4. The pan according to claim 1, wherein the hook of the fastening device comprises an upper edge with a curved profile to facilitate the upper sliding of the plate on the baking molds.

5. The pan according claim 1, wherein the plate comprises a plurality of recesses, each one of the recesses acting by way of a cover of each one of the baking molds, each one of the recesses defining an insert ("e") configured to penetrate in an inner cavity of each one of the baking molds in an upper edge of walls of the baking molds.

6. The pan according to claim 5, wherein the recesses of the plate each define an insert ("e") configured to penetrate the inner cavity of the baking mold a distance equal or greater than 5 mm in the upper edge of the walls of the baking molds.

7. The pan according to claim 5, wherein the recesses each comprise a surface with corrugations designed to cover an opening of the baking molds.

8. The pan according to claim 7, wherein the surface with corrugations has a substantially convex profile.

9. The pan according to claim 7, wherein the surface with corrugations comprises a plurality of orifices to allow entry of air.

10. The pan according to claim 1, comprising a reinforcing structure which includes a tubular profile disposed on a periphery of the pan, the tubular profile enveloping edges of the plurality of baking molds and the tubular profile being separated from the edges so that it defines a space for air circulation.

11. The pan according to claim 10, wherein the tubular profile is mounted so that it substantially protrudes from a base of the baking molds.

12. The pan according to claim 10, comprising a plurality of lugs for vertical stacking of two or more units, the plurality of lugs being associated to the reinforcing structure of the pan and the lugs being susceptible of being inserted in a plurality of receiving cavities associated to the reinforcing structure of another pan, the plate acting as a cover of the pan being provided with a plurality of grooves where through the lugs protrude when the recesses of the plate cover the openings of the baking molds.

13. The pan according to claim 5, wherein side walls of the baking molds comprise corrugations, lacking at least an upper edge of the walls of the corrugations to enable the insert of the recesses of the plate.

14. The pan according to claim 13, wherein the corrugations of the side walls define a plurality of ribs which are vertically disposed with respect to a base of the pan.

15. The pan according to claim 1, wherein said plate comprises an upper cover portion arranged traversed in a plate groove, said hook being susceptible of gripping said upper cover portion when it tilts and traverses the plate groove.

16. The pan according to claim 1, wherein the plate comprises a plurality of grooves which extend longitudinally between each two baking moulds, at least one groove comprises a cover portion of the plate arranged to be able to be gripped by the hook when it tilts by gravity by the action of the weight configured by way of a counterweight.

\* \* \* \* \*